United States Patent
Kitayama et al.

(12)

(10) Patent No.: US 6,902,591 B2
(45) Date of Patent: Jun. 7, 2005

(54) POLISHING COMPOSITION

(75) Inventors: Hiroaki Kitayama, Wakayama (JP); Shigeo Fujii, Wakayama (JP); Yoshiaki Oshima, Wakayama (JP); Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/625,593

(22) Filed: Jul. 24, 2003

(65) Prior Publication Data

US 2004/0025742 A1 Feb. 12, 2004

(30) Foreign Application Priority Data

Aug. 7, 2002 (JP) ........................................ 2002-230020
Aug. 30, 2002 (JP) ........................................ 2002-255411

(51) Int. Cl.[7] ............................ C09G 1/02; C09G 1/04; B24B 1/00
(52) U.S. Cl. ............................ 51/307; 51/308; 51/309; 106/3; 438/692; 438/693; 216/103; 216/106; 216/108
(58) Field of Search .......................... 51/307, 308, 309; 106/3; 438/692, 693; 216/100, 102, 103, 105, 106, 108

(56) References Cited

U.S. PATENT DOCUMENTS 5,800,577 A * 9/1998 Kido ........................... 51/307
6,193,790 B1 * 2/2001 Tani ............................. 106/3

FOREIGN PATENT DOCUMENTS

| EP | 0984049 A1 | 3/2000 |
| GB | 2338490 A | 12/1999 |
| JP | 2002-12857 A | 1/2002 |
| JP | 2002-20732 A | 1/2002 |
| JP | 2002-167575 A | 6/2002 |
| WO | WO 99/35089 A1 | 7/1999 |

* cited by examiner

Primary Examiner—Michael A Marcheschi
(74) Attorney, Agent, or Firm—Birch, Stewart, Kolasch & Birch, LLP

(57) ABSTRACT

A polishing composition comprising an abrasive, water and an organic acid or a salt thereof, wherein the composition has a specified viscosity of from 1.0 to 2.0 mPa·s at a shearing rate of $1500\ s^{-1}$ and 25° C.; a roll-off reducing agent comprising a Brönsted acid or a salt thereof, having an action of lowering viscosity so that the amount of viscosity lowered is 0.01 mPa·s or more, wherein the amount of viscosity lowered is expressed by the following equation:

(Amount of Viscosity Lowered)=(Viscosity of Standard Polishing Composition)−(Viscosity of Roll-Off Reducing Agent-Containing Polishing Composition), wherein the standard polishing composition is prepared which comprises 20 parts by weight of an abrasive, said abrasive being high-purity alumina having $Al_2O_3$ purity of 98.0% by weight or more composed of α-type co-random crystal, 1 part by weight of citric acid, and 79 parts by weight of water; the roll-off reducing agent-containing polishing composition is prepared which comprises 20 parts by weight of an abrasive, said abrasive being high-purity alumina having $Al_2O_3$ purity of 98.0% by weight or more composed of α-type co-random crystal, 1 part by weight of citric acid, 78.9 parts by weight of water and 0.1 parts by weight of a roll-off reducing agent; and the viscosity is a viscosity at a shearing rate of $1500\ s^{-1}$ and 25° C. The polishing composition can be favorably used in polishing the substrate for precision parts.

10 Claims, 1 Drawing Sheet

POLISHING COMPOSITION

BACKGROUND OF THE INVENTION

1. Field of the Invention

The present invention relates to a polishing composition having a specified viscosity, a roll-off reducing agent and a polishing composition using the roll-off reducing agent. Furthermore, the present invention relates to a process for producing a substrate comprising applying the polishing composition to the substrate, and a process for reducing roll-off of a substrate.

2. Discussion of the Related Art

Over the years, a demand for a technique for further increasing the capacity of the hard discs has become greater. As a leading means for increasing the capacity of the hard discs, there has been considered a means of producing a substrate capable of recording data even to its outer periphery by reducing roll-off (edge rounding of end side of a substrate) caused in the polishing process. For instance, various mechanical polishing conditions, such as making a polishing pad more rigid, and making a polishing load smaller, have been studied in order to produce a substrate having a reduced roll-off. However, although a certain extent of an effect is obtained by reducing roll-off with these mechanical polishing conditions, the effect has not yet been satisfactory. Also, from the viewpoint of reducing roll-off with the polishing composition used in the polishing step, the use of a specified organic acid represented by an organic acid having hydroxyl group (Japanese Patent Laid-Open No. 2002-12857), the use of sol product of aluminum salt (Japanese Patent Laid-Open No. 2002-20732), the use of polyalkylene oxide compound (Japanese Patent Laid-Open No. 2002-167575), and the like have been proposed. However, roll-off cannot be said to be satisfactorily reduced.

SUMMARY OF THE INVENTION

According to the present invention, there are provided:

[1] a polishing composition comprising an abrasive, water and an organic acid or a salt thereof, wherein the composition has a specified viscosity of from 1.0 to 2.0 mPa·s at a shearing rate of 1500 s$^{-1}$ and 25° C.;

[2] a roll-off reducing agent comprising a Brönsted acid or a salt thereof, having an action of lowering viscosity so that an amount of viscosity lowered is 0.01 mPa·s or more, wherein the amount of viscosity lowered is expressed by the following equation:

(Amount of Viscosity Lowered)=(Viscosity of Standard Polishing Composition)−(Viscosity of Roll-Off Reducing Agent-Containing Polishing Composition), wherein the standard polishing composition is prepared which comprises 20 parts by weight of an abrasive, the abrasive being high-purity alumina having Al$_2$O$_3$ purity of 98.0% by weight or more composed of α-type co-random crystal, 1 part by weight of citric acid, and 79parts by weight of water; the roll-off reducing agent-containing polishing composition is prepared which comprises 20 parts by weight of an abrasive, the abrasive being high-purity alumina having Al$_2$O$_3$ purity of 98.0% by weight or more composed of α-type co-random crystal, 1 part by weight of citric acid, 78.9 parts by weight of water and 0.1 parts by weight of a roll-off reducing agent; and the viscosity is a viscosity at a shearing rate of 1500 s$^{-1}$ and 25° C.;

[3] a polishing composition comprising the roll-off reducing agent as defined in [2] above, an abrasive and water;

[4] a process for producing a substrate comprising a step of polishing a substrate to be polished with the polishing composition as defined in [1] or [3] above;

[5] a process of reducing roll-off of a substrate to be polished, comprising applying to the substrate the polishing composition as defined in [1] or [3] in the polishing step.

DETAILED DESCRIPTION OF THE INVENTION

Figure 1:
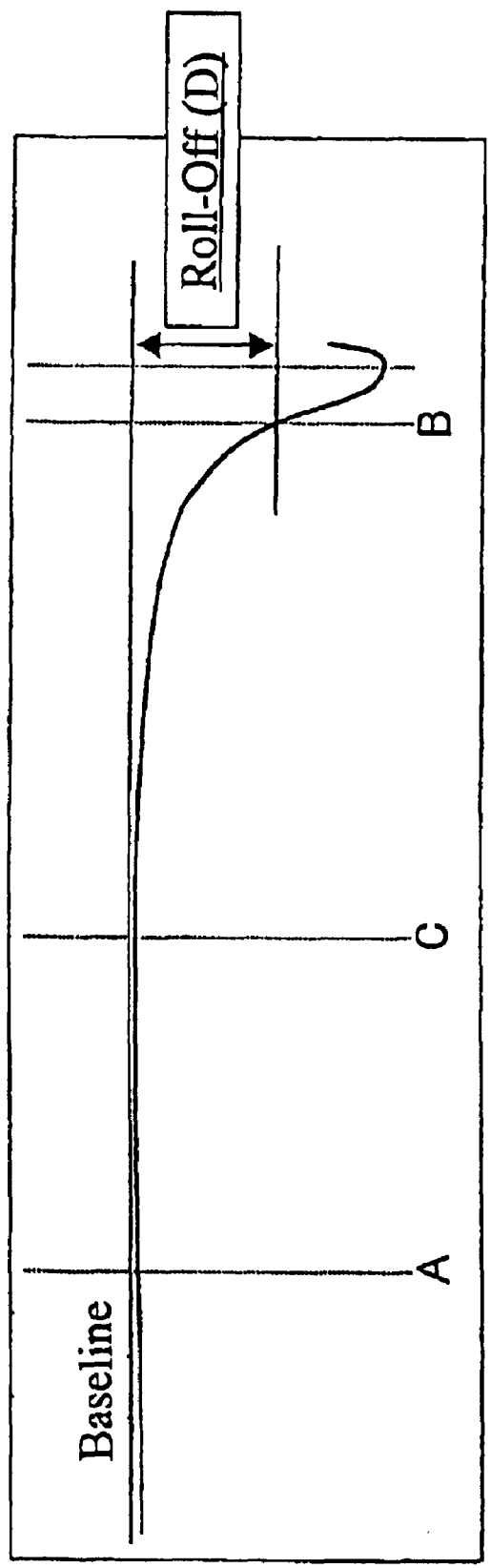
FIG. 1 is a graph showing a roll-off in connection with a detection curve.

The present invention relates to a roll-off reducing agent having sufficient polishing rate and being capable of reducing the roll-off of a substrate caused by polishing; a polishing composition comprising the roll-off reducing agent; a process for producing a substrate comprising applying the polishing composition to a substrate; and a process of reducing roll-off of a substrate, comprising applying to a substrate to be polished the polishing composition.

These and other advantages of the present invention will be apparent from the following description.

1. Polishing Composition of Embodiment a

One of the greatest features of the polishing composition of the present invention (which may be hereinafter also referred to as "polishing composition of the embodiment a") resides in that the polishing composition comprises an abrasive, water and an organic acid or a salt thereof, wherein the composition has a specified viscosity of from 1.0 to 2.0 mPa·s at a shearing rate of 1500 s$^{-1}$ and 25° C. Since the polishing composition has the above characteristics, there are exhibited remarkable effects that the roll-off of a substrate can be significantly reduced, while the polishing rate is maintained, so that a substrate capable of recording to its outer peripheral portion can be produced. Although the function mechanisms for reducing the roll-off are not elucidated into details, they may be presumably as follows. Specifically, since the viscosity at high shearing rate of the polishing composition of the embodiment a is reduced, the feeding property of the polishing composition between the polishing pad and the object to be polished and the discharge property of the polishing debris are improved. Accordingly, the polished amount of the internal of the object to be polished increases and the difference in the polishing rates between the internal and the outer side (edge side portion) of the object to be polished becomes relatively small, thereby resulting in the reduction of the roll off.

The term "specified viscosity" as used in the present invention refers to a viscosity of a polishing composition at a shearing rate of 1500 s$^{-1}$ and 25° C. Concretely, the specified viscosity is a value obtained by using a device commercially available from Rheometric Scientific F. E. Ltd. under the trade name of ARES-100FRT-BATH-STD under the conditions described above.

The polishing composition of the embodiment a of the present invention has a specific viscosity of a polishing composition of from 1.0 to 2.0 mPa·s at a shearing rate of 1500 s$^{-1}$ and 25° C. The specific viscosity is preferably from 1.3 to 2.0 mPa·s, especially preferably 1.5 to 1.9 mPa·s, from the viewpoint of improving the amount of the polishing composition of the embodiment a supplied between the polishing pad and the substrate to be polished and the removability of the polishing debris, thereby obtaining a sufficient roll-off reducing action, and from the viewpoint of maintaining the polishing rate.

The polishing composition of the embodiment a of the present invention comprises an abrasive, water and an organic acid or a salt thereof. As the abrasive used in the present invention, any abrasives generally employed for polishing can be used. The abrasive includes, for instance, metals; carbides of metals or metalloids, nitrides of metal elements or metalloid elements, oxides of metals or metalloids, borides of metals or metalloids, diamond, and the like. The elements for the metals or metalloids include those elements belonging to the Group 2A, 2B, 3A, 3B, 4A, 4B, 5A, 6A, 7A or 8 of the Periodic Table (long period form). Concrete examples of the abrasive include α-alumina particles, intermediate alumina particles, alumina sol, silicon carbide particles, diamond particles, magnesium oxide particles, zinc oxide particles, cerium oxide particles, zirconium oxide particles, colloidal silica particles, fumed silica particles, and the like. It is preferable to use one or more kinds of these abrasives, from the viewpoint of increasing the polishing rate. Also, these abrasives may be used in admixture of two or more kinds depending upon the necessity of the polishing property. As to the abrasives depending upon their applications, alumina particles such as α-alumina particles, intermediate alumina particles and alumina sol are preferred for rough polishing of an Ni—P plated aluminum alloy substrate, and further a combination of α-alumina particles and intermediate alumina particles (especially θ-alumina particles) is especially preferable, from the viewpoints of increase of polishing rate, prevention of surface defects and reduction of the surface roughness. In addition, silica particles such as colloidal silica particles and fumed silica particles are preferred for finish polishing of an Ni—P plated aluminum alloy substrate. Cerium oxide particles and alumina particles are preferred for polishing glassy materials. Cerium oxide particles, alumina particles and silica particles are preferred for polishing semiconductor wafer, semiconductor element and the like.

The average primary particle size of the abrasive is preferably from 0.01 to 3 μm, more preferably from 0.01 to 0.8 μm, especially preferably from 0.02 to 0.5 μm, from the viewpoint of increasing the polishing rate. Further, when the primary particles are aggregated to form a secondary particle, the average secondary particle size is preferably from 0.02 to 3 μm, more preferably from 0.05 to 1.5 μm, especially preferably from 0.1 to 1.2 μm, from the viewpoint of increasing the polishing rate in the same manner as above, and from the viewpoint of reducing the surface roughness of a polished object. The average primary particle size of the abrasive is obtained by subjecting the abrasive to an image analysis by observing with a scanning electron microscope (favorably from 3000 to 30000 times) or a transmission electron microscope (favorably from 10000 to 300000 times), and determining the particle size. In addition, the average secondary particle size can be determined as volume-average particle size by using a laser diffraction method.

The specific gravity of the abrasive is preferably from 2 to 6, more preferably from 2 to 5, from the viewpoints of the dispersibility, the feed ability to the polishing device and recovery and reuse.

The content of the abrasive is preferably from 1 to 40% by weight, more preferably from 2 to 30% by weight, still more preferably from 3 to 25% by weight, of the polishing composition of the embodiment a, from the viewpoints of having economic advantages and making the surface roughness of a polished object small, thereby efficiently polishing the substrate to be polished.

Water in the polishing composition of the embodiment a of the present invention is used as a medium, and the content of water is preferably from 55 to 98.99% by weight, more preferably from 60 to 97.5% by weight, still more preferably from 70 to 96.8% by weight, from the viewpoint of efficiently polishing the object to be polished.

In addition, the polishing composition of the embodiment a of the present invention comprises an organic acid or a salt thereof.

The organic acid or a salt thereof includes monocarboxylic or polycarboxylic acids, aminocarboxylic acids, amino acids and salts thereof, and the like. These compounds can be roughly divided into the compounds (A) and the compounds (B) from their properties.

Although the compound belonging to the compounds (A) alone can increase the polishing rate, the compound also has a remarkable characteristic of having an action of reducing roll-off when using the compound (A) in combination with another agent for improving polishing rate represented by the compounds (B). The compound for the compounds (A) is at least one compound selected from the group consisting of a monocarboxylic acid or polycarboxylic acid having 2 to 20 carbon atoms and having either OH group or groups or SH group or groups, a dicarboxylic acid having 2 to. 3 carbon atoms, and a monocarboxylic acid having 1 to 20 carbon atoms. It is desired that the number of carbon atoms of the monocarboxylic or polycarboxylic acid having either OH group or groups or SH group or groups is from 2 to 20, preferably from 2 to 10, more preferably from 2 to 8, still more preferably from 2 to 6, from the viewpoint of the solubility to water. For instance, an α-hydroxycarboxyl compound is preferred from the viewpoint of reducing the roll-off. The dicarboxylic acid having 2 to 3 carbon atoms means specifically oxalic acid and malonic acid. It is desired that the number of carbon atoms of the monocarboxylic acid is from 1 to 20, preferably from 1 to 10, more preferably from 1 to 8, still preferably from 1 to 5, from the viewpoint of the solubility to water. Among the compounds (A), α-hydroxycarboxylic acid or a salt thereof is preferable from the viewpoint of the polishing rate.

Examples of the monocarboxylic or polycarboxylic acid having 2 to 20 carbon atoms and having either OH group or groups or SH group or groups, the dicarboxylic acid having 2 to 3 carbon atoms, and the monocarboxylic acid having 1 to 20 carbon atoms include those described in page 2, right column, line 44 to page 3, left column, line 45 of Japanese Patent Laid-Open No. 2002-12857, the entire contents of which are incorporated herein by reference, and the like.

Concrete examples of the monocarboxylic or polycarboxylic acid having 2 to 20 carbon atoms and having either OH group or groups or SH group or groups include glycolic acid, mercaptosuccinic acid, thioglycolic acid, lactic acid, β-hydroxypropionic acid, malic acid, tartaric acid, citric acid, isocitric acid, allocitric acid, gluconic acid, glyoxylic acid, glyceric acid, mandelic acid, tropic acid, benzilic acid, salicylic acid, and the like. Concrete examples of the monocarboxylic acid having 1 to 20 carbon atoms include formic acid, acetic acid, propionic acid, butyric acid, isobutyric acid, valeric acid, isovaleric acid, hexanoic acid, heptanoic acid, 2-methylhexanoic acid, octanoic acid, 2-ethylhexanoic acid, nonanoic acid, decanoic acid, lauric acid, and the like. Among them, acetic acid, oxalic acid, malonic acid, glycolic acid, lactic acid, malic acid, tartaric acid, glyoxylic acid, citric acid and gluconic acid are preferable; oxalic acid, malonic acid, glycolic acid, lactic acid, malic acid, tartaric acid, glyoxylic acid, citric acid and gluconic acid are more preferable; citric acid, malic acid and tartaric acid are especially preferable; and citric acid is most preferable.

The salts of these compounds (A) are not particularly limited. Concrete examples include salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of reducing clogging, those metals belonging to Group 1A, 3A, 3B, 7A or 8 of the Periodic Table are preferable, and those metals belonging to Group 1A, 3A or 3B of the Periodic Table are more preferable. Sodium and potassium belonging to Group 1A are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are especially preferable.

The compounds (A) can be used alone or in admixture of two or more kinds.

The compounds (B) used in the present invention are compounds especially having excellent action for increasing polishing rates. The compounds (B) include a polycarboxylic acid having 4 or more carbon atoms and having neither OH group or groups nor SH group or groups, an aminocarboxylic acid, an amino acid, a salt thereof and the like.

From the viewpoint of increasing the polishing rate, among the polycarboxylic acids having 4 or more carbon atoms and having neither OH group or groups nor SH group or groups, those having 4 to 20 carbon atoms are preferable, and those having 4 to 10 carbon atoms are more preferable in consideration of the additional viewpoint of the water solubility. Also, it is desired that the number of carboxyl groups of the polycarboxylic acid is from 2 to 10, preferably from 2 to 6, especially preferably from 2 to 4. In addition, from the same viewpoints, in the aminocarboxylic acid, the number of amino groups in one molecule is preferably from 1 to 6, more preferably from 1 to 4. The number of carboxylate groups of the aminocarboxylic acid is preferably from 1 to 12, more preferably from 2 to 8. The number of carbon atoms is preferably from 1 to 30, more preferably 1 to 20. From the same viewpoints, the number of carbon atoms of the amino acid is preferably from 2 to 20, more preferably from 2 to 10.

Examples of the compounds (B) include those described in page 4, left column, lines 13 to 30 of Japanese Patent Laid-Open No. 2002-30276, the entire contents of which are incorporated herein by reference, and the like.

Concrete examples of the compounds (B) include succinic acid, maleic acid, fumaric acid, glutaric acid, citraconic acid, itaconic acid, tricarballylic acid, adipic acid, propane-1,1,2,3-tetracarboxylic acid, butane-1,2,3,4-tetracarboxylic acid, diglycolic acid, nitrilotriacetic acid, ethylenediaminetetraacetic acid, diethylenetriaminepentaacetic acid, hydroxyethylethylenediaminetetraacetic acid, triethylenetetraminehexaacetic acid, dicarboxymethylglutamic acid, glycine, alanine, and the like.

Among them, succinic acid, maleic acid, fumaric acid, glutaric acid, citraconic acid, itaconic acid, tricarballylic acid, adipic acid, diglycolic acid, nitrilotriacetic acid, ethylenediaminetetraacetic acid and diethylenetriaminepentaacetic acid are preferable, and succinic acid, maleic acid, fumaric acid, citraconic acid, itaconic acid, tricarballylic acid, diglycolic acid, ethylenediaminetetraacetic acid and diethylenetriaminepentaacetic acid are more preferable.

The salts of these compounds (B) include the same ones as those for the above-mentioned compounds (A).

The compounds (B) can be used alone or in admixture of two or more kinds.

Furthermore, it is especially preferable that the compounds (A) and the compounds (B) are used in combination from the viewpoint of the balance in the polishing properties.

The content of the organic acid or a salt thereof in the polishing composition of the embodiment a of the present invention is preferably from 0.01 to 10% by weight, more preferably from 0.02 to 7% by weight, still more preferably from 0.03 to 5% by weight, of the polishing composition of the embodiment a, from the viewpoint of exhibiting its function and from the viewpoint of economic advantages.

Also, it is preferable that the polishing composition of the embodiment a of the present invention comprises a viscosity-reducing agent, from the viewpoint of reducing the roll-off. One of concrete examples of the viscosity-reducing agent includes a phosphate-based compound. More concretely, the viscosity-reducing agent includes a linear or cyclic inorganic phosphoric acid, an organophophonic acid or a salt thereof; a monophosphate, a diphosphate and a salt thereof; and the like. The linear or cyclic inorganic phosphoric acid includes phosphoric acid, polyphosphoric acid, metaphosphoric acid, pyrophosphoric acid, and the like; the organophophonic acid includes aminotri (methylenephosphonic acid) "Dequest 2000 (commercially available from SOLUTIA JAPAN INC.)," 1-hydroxyethylidene-1,1-diphosphonic acid "Dequest 2010 (commercially available from SOLUTIA JAPAN INC.)," tricarboxylbutanephosphonic acid "Dequest 7000 (commercially available from SOLUTIA JAPAN INC.)," and the like; the monophosphate includes lauryl monophosphate, stearyl monophosphate, polyoxyethylene monolauryl ether monophosphate, polyoxyethylene monomyristyl ether monophosphate, and the like; and the diphosphate includes dilauryl diphosphate, bis(polyoxyethylene monolauryl ether) and the like. Among them, the inorganic phosphoric acid-based compounds are preferable, from the viewpoints of industrial availability, economic advantages and easy handling, and the inorganic condensed-type phosphoric acid-based compounds are especially preferable. Other viscosity-reducing agents include a hydrophilic compound having a polyoxyethylene group, for instance, polyethylene glycol (PEG), polyethylene oxide polypropylene oxide polymer, and the like.

The content of the viscosity-reducing agent in the polishing composition of the embodiment a is preferably 0.001% by weight or more of the polishing composition of the embodiment a, from the viewpoint of reducing the viscosity (roll-off reduction) and from the viewpoint of polishing performance. In addition, the content of the viscosity-reducing agent is 5% by weight or less, from the viewpoint of economic advantage and from the viewpoint of surface quality of the object to be polished. The content of the viscosity-reducing agent is more preferably from 0.001 to 3% by weight, still more preferably from 0.003 to 1.5% by weight, most preferably from 0.005 to 1.0% by weight.

In addition, in the polishing composition of the embodiment a of the present invention, there can be formulated other components according to its purpose. The other components include, for instance, inorganic acids and salts thereof, oxidizing agents, anticorrosive agents, basic substances, and the like. Concrete examples of the inorganic acids and salts thereof, and the oxidizing agents include those listed in Japanese Patent Laid-Open No. Sho 62-25187, page 2, upper right column, lines 3 to 11; Japanese Patent Laid-Open No. Sho 63-251163, page 2, lower left column, lines 7 to 14; Japanese Patent Laid-Open No. Hei 1-205973, page 3, upper left column, line 11 to upper right column, line 2; Japanese Patent Laid-Open No. Hei 3-115383, page 2, lower right column, line 16 to page 3, upper left column, line 11; Japanese Patent Laid-Open No. Hei 4-275387, page 2, right column, line 27 to page 3, left column, line 12, the entire contents of which are incorporated herein by reference, and the like. Concrete examples of the inorganic compound or a salt thereof include a sulfur-containing inorganic acid or a salt thereof, represented by sulfuric acid, ammonium sulfate, potassium sulfate, nickel sulfate, aluminum sulfate, aluminum sulfite, ammonium sulfamate and the like. These other components can be used alone or in admixture of two or more kinds. The content of the other components is preferably from 0.05 to 20% by weight, more preferably from 0.05 to 10% by weight, still more preferably from 0.05 to 5% by weight, of the polishing composition of the embodiment a, from the viewpoint of exhibiting the respective functions and from the viewpoint of economic advantages.

In addition, the polishing composition of the present invention can optionally comprise other components such as a disinfectant and an antibacterial agent. The content of these disinfectant and antibacterial agent is preferably from 0.0001 to 0.1% by weight, more preferably from 0.001 to 0.05% by weight, still more preferably from 0.002 to 0.02% by weight, of the polishing composition of the embodiment a, from the viewpoint of exhibiting the respective functions, and from the viewpoints of influences to the polishing performances and economic advantages.

The concentration of each component of the above-mentioned polishing composition of the embodiment a is a preferable concentration during polishing, and it may be a concentration during the preparation of the composition. The polishing composition of the embodiment a is usually prepared as a concentrate, and the concentrate is diluted upon use in many cases.

The polishing composition of the embodiment a can be prepared by adding the desired additives by an arbitrary method, and mixing the components.

It is preferable that the pH of the polishing composition of the embodiment a is appropriately adjusted depending upon the kinds and the required qualities and the like of the substrate to be polished. For instance, the pH of the polishing composition of the embodiment a is preferably from 2 to 12, from the viewpoints of the cleanability of the substrate to be polished and the anti-corrosiveness of the working machine, and from the viewpoint of the safety of the operator. In addition, in a case where a substrate to be polished is a substrate for precision parts which is mainly made of a metal such as an Ni—P plated aluminum alloy substrate, the pH is preferably from 2 to 10, more preferably from 2 to 9, still more preferably from 2 to 7, especially preferably from 2 to 5, from the viewpoints of increasing the polishing rate, improving the surface qualities, and preventing clogging of the polishing pad. When the polishing composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 11, especially preferably from 9 to 11, from the viewpoints of increasing the polishing rate and improving the surface qualities. The pH can be adjusted by adding properly an inorganic acid such as nitric acid or sulfuric acid, an organic acid such as a hydroxycarboxylic acid, a poly-carboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

2. Roll-Off Reducing Agent

As mentioned above, the roll-off reducing agent of the present invention comprises a Brönsted acid or a salt thereof, having an action of lowering viscosity so that the amount of viscosity lowered expressed by the following equation:

(Amount of Viscosity Lowered)=(Viscosity of Standard Polishing Composition)−(Viscosity of Roll-Off Reducing Agent-Containing Polishing Composition), wherein the standard polishing composition is prepared which comprises 20 parts by weight of an abrasive, the abrasive being high-purity alumina having $Al_2O_3$ purity of 98.0% by weight or more composed of α-type co-random crystal, 1 part by weight of citric acid, and 79 parts by weight of water; the roll-off reducing agent-containing polishing composition is prepared which comprises 20 parts by weight of an abrasive, the abrasive being high-purity alumina having $Al_2O_3$ purity of 98.0% by weight or more composed of α-type co-random crystal, 1 part by weight of citric acid, 78.9 parts by weight of water and 0.1 parts by weight of a roll-off reducing agent; and the viscosity (hereinafter referred to as "specified viscosity") is a viscosity of 0.01 mPa·s or more at a shearing rate of 1500 $s^{-1}$ and 25° C.

In the present invention, since the roll-off reducing agent is formulated in the polishing composition, there are exhibited some remarkable effects that the roll-off of the substrate can be significantly reduced, so that a substrate capable of recording to an outer peripheral portion having a large memory capacity can be produced.

In the roll-off reducing agent of the present invention, the amount of viscosity lowered of the roll-off reducing agent-containing polishing composition is 0.01 mPa·s or more, preferably 0.02 mPa·s or more, more preferably 0.03 mPa·s or more, especially preferably 0.1 mPa·s or more, at a shearing rate of 1500 $s^{-1}$ and 25° C. (specified viscosity), from the viewpoints of improving the amount of the polishing composition fed between the polishing pad and the substrate to be polished as described below and the removability of the polishing debris, and obtaining a sufficient roll-off reducing action, and the amount of viscosity lowered of the roll-off reducing agent-containing polishing composition is preferably 1 mPa·s or less, more preferably 0.9 mPa·s or less, from the viewpoint of obtaining a sufficient polishing rate. Therefore, from the both aspects of the roll-off reducing action and the polishing rate, the amount of the specified viscosity lowered is preferably from 0.02 to 1 mPa·s, more preferably from 0.03 to 1 mPa·s, especially preferably from 0.1 to 0.9 mPa·s.

In the present invention, the standard polishing composition is a polishing composition comprising 20 parts by weight of an abrasive, the abrasive being high-purity alumina having $Al_2O_3$ purity of 98.0% by weight or more composed of α-type co-random crystal, 1 part by weight of citric acid and 79 parts by weight of water. The roll-off reducing agent-containing polishing composition is a polishing composition comprising 20 parts by weight of an abrasive, the abrasive being high-purity alumina having $Al_2O_3$ purity of 98.0% by weight or more composed of α-type co-random crystal, 1 part by weight of citric acid, 78.9 parts by weight of water and 0.1 parts by weight of a roll-off reducing agent. Also, the amount of viscosity lowered in the present invention refers to an amount of viscosity lowered of the roll-off reducing agent-containing polishing composition relative to the above-mentioned standard polishing composition, wherein the amount of viscosity lowered can be calculated by the following equation:

(Amount of Viscosity Lowered)=(Viscosity of Standard Polishing Composition)−(Viscosity of Roll-Off Reducing Agent-Containing Polishing Composition)

As the high-purity alumina having $Al_2O_3$ purity of 98.0% by weight or more composed of α-type co-random crystal used as an abrasive when the above-mentioned amount of viscosity lowered is determined, the high-purity alumina containing 1.2% by weight or less of $SiO_2$, 0.2% by weight or less of $Fe_2O_3$, and 0.7% by weight or less of $Na_2O$ as other components is preferable, and the alumina having a particle size at 50% accumulative height of 0.6 μm is preferable. Concrete examples thereof include one commercially available from Fujimi Incorporated under the trade name of "WA#10000."

The above-mentioned viscosity is a viscosity of the polishing composition at a shearing rate of $1500 \text{ s}^{-1}$ and 25° C., which is determined by an equipment which can determine high shearing viscosity of the polishing composition. Concretely, the viscosity refers to a value determined by using a product commercially available from Rheometric Scientific F. E. Ltd. under the trade name of ARES-100FRT-BATH-STD under the conditions described in Examples set forth below.

The roll-off reducing agent of the present invention has an action of reducing roll-off of a substrate to be polished in addition to its action of lowering the specified viscosity of the polishing composition as mentioned above. Although the details of these two function mechanisms are not elucidated, they may be presumably as follows: Specifically, since the roll-off reducing agent acts on the interface of the dispersion medium as a so-called rheology-controlling agent, the size, the number or the like of impact mainly between the dispersion medium particles is controlled, and the structure for forming other compounds is destroyed, whereby the above-mentioned specified viscosity is reduced. Therefore, since the specified viscosity of the polishing composition is reduced, the feeding property of the polishing composition between the polishing pad and the substrate to be polished and the dischargeability of the polishing debris are improved, whereby the amount polished at the internal of the object to be polished (central portion of the substrate) is increased. Therefore, the relative difference in the polishing rates at the internal and the outer peripheral portion (end surface portion) becomes small, whereby consequently the roll-off can be reduced.

The roll-off reducing agent used in the present invention is a Brönsted acid or a salt thereof, having an action of reducing the specified viscosity of the polishing composition to 0.01 mPa·s or more. Here, the term "Brönsted acid" refers to a compound which can give $H^+$ to water molecules by forming an aqueous solution and generate oxonium ion. Also, the salt thereof is not particularly limited. Examples of the salt include a salt with a metal, ammonium, an alkylammonium, or an organic ammonium such as an organic amine.

It is preferable that the above-mentioned roll-off reducing agent is a compound having in its molecule one or more functional groups represented by the formulas 1 to 3:

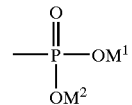

(1)

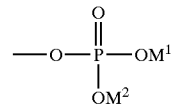

(2)

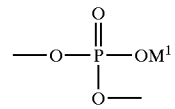

(3)

wherein each of $M^1$ and $M^2$, which may be identical or different, hydrogen atom, a metal atom, ammonium, or an organic ammonium; or a compound represented by the formula 4:

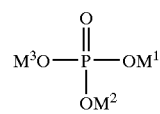

(4)

wherein $M^1$ and $M^2$ are as defined above; $M^3$ is hydrogen atom, a metal atom, ammonium, or an organic ammonium.

The molecular weight of the roll-off reducing agent having functional groups represented by the formulas 1 to 3 in its molecule is preferably from 100 to 10000, more preferably from 100 to 5000, still more preferably from 150 to 2000, from the viewpoints of lowering of the specified viscosity and easy handling.

The number of functional groups represented by the formulas 1 to 3 per one molecule of the roll-off reducing agent is preferably from 1 to 100, more preferably from 1 to 50, still preferably from 1 to 20, from the viewpoints of lowering of the specified viscosity and easy handling.

Among the compounds having one or more functional groups represented by the formulas 1 to 3 and the compound represented by the formula 4, when the amount of viscosity lowered is considered, the compound having a functional group represented by the formula 1, 2 or 3 is preferable, and the compound having a functional group represented by the formula 2 or 3 is especially preferable.

Among them, from the viewpoint of industrial availability, it is more preferable that the compound having a functional group represented by the formula 1 is a compound represented by the formula 5:

$$R^1-\underset{\underset{OM^2}{|}}{\overset{\overset{O}{\|}}{P}}-OM^1 \quad (5)$$

wherein $R^1$ is a hydrocarbon group having 1 to 24 carbon atoms; and $M^1$ and $M^2$ are as defined above.

In this case, one or more hydrogen atoms in $R^1$ may be substituted by hydroxyl group, amino group or a functional group represented by the formula 1. In addition, it is more preferable that the compound having a functional group represented by the formula 2 is a compound represented by the formula 6 or 7:

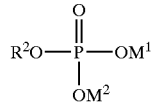

(6)

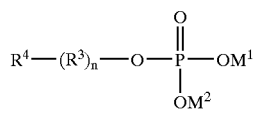

(7)

wherein $R^2$ is a hydrocarbon group having 1 to 24 carbon atoms which may have other functional group; $R^3$ is an alkylene oxide group having 2 to 4 carbon atoms, or a group represented by the formula:

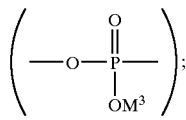

$R^4$ is a hydrocarbon group having 1 to 24 carbon atoms and hydrogen atom; n is a positive integer of 1 to 100; and $M^1$, $M^2$ and $M^3$ are as defined above. In the formula, one or more hydrogen atoms in the hydrocarbon group of $R^2$ and $R^4$ may be substituted by a functional group such as hydroxyl group or amino group. Further, it is preferable that the compound having a functional group represented by the formula 3 is a compound represented by the formula 8:

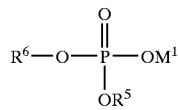

(8)

wherein each of $R^5$ and $R^6$ is a hydrocarbon group having 1 to 24 atoms; and $M^1$ is as defined above.

In the formula, one or more hydrogen atoms in the hydrocarbon groups of $R^5$ and $R^6$ may be substituted by a functional group such as hydroxyl group or amino group.

When $M^1$ to $M^3$ of the formulas are not hydrogen atoms, concrete examples of the metals include those metals belonging to the Group 1A, 1B, 2A, 2B, 3A, 3B, 4A, 6A, 7A or 8 of the Periodic Table (long period form). Among these metals, those metals belonging to the Group 1A, 3A, 3B, 7A or 8 of the Periodic Table are preferable, those metals belonging to the Group 1A, 3A or 3B of the Periodic Table are more preferable, and sodium and potassium belonging to Group 1A of the Periodic Table are most preferable, from the viewpoint of reducing the roll-off. Concrete examples of the alkylammonium include tetramethylammonium, tetraethylammonium, tetrabutylammonium, and the like. Concrete examples of the organic amine include dimethylamine, trimethylamine, alkanolamines, and the like. Among them, ammonium, sodium and potassium are especially preferable.

Concrete examples of the compounds having functional groups represented by the above formulas 1 to 3 and the compound represented by the formula 4 include a linear or cyclic inorganic phosphoric acid, an organophophonic acid or a salt thereof; a monophosphate, a diphosphate and a salt thereof; and the like. The linear or cyclic inorganic phosphoric acid includes phosphoric acid, polyphosphoric acid, metaphosphoric acid, pyrophosphoric acid, and the like; the organophophonic acid includes aminotri (methylenephosphonic acid) "Dequest 2000 (commercially available from SOLUTIA JAPAN INC.)," 1-hydroxyethylidene-1, 1-diphosphonic acid "Dequest 2010 (commercially available from SOLUTIA JAPAN INC.)," tricarboxylbutanephosphonic acid "Dequest 7000 (commercially available from SOLUTIA JAPAN INC.)," and the like; the monophosphate includes lauryl monophosphate, stearyl monophosphate, polyoxyethylene monolauryl ether monophosphate, polyoxyethylene monomyristyl ether monophosphate, and the like; and the diphosphate includes dilauryl diphosphate, bis(polyoxyethylene monolauryl ether) and the like. Among them, the inorganic phosphoric acids are preferable, from the viewpoints of industrial availability, economic advantages and easy handling, and inorganic condensed type phosphoric acids in which two or more inorganic phosphoric acids are condensed are especially preferable.

3. Roll-Off Reducing Agent Composition

The roll-off reducing agent of the present invention can be used by formulating the roll-off reducing agent in a polishing composition comprising an abrasive and water. The polishing composition thus obtained is especially referred to herein as "roll-off reducing agent composition." Specifically, the roll-off reducing agent composition of the present invention comprises at least the above-mentioned roll-off reducing agent, an abrasive and water.

The content of the above-mentioned roll-off reducing agent in the roll-off reducing agent composition is preferably 0.001% by weight or more, from the viewpoint of reducing viscosity (reducing roll-off) and from the viewpoint of polishing performance, and the content is preferably 5% by weight or less, from the viewpoints of economic advantages, and from the viewpoint of the surface quality of the object to be polished. The content of the roll-off reducing agent is more preferably from 0.005 to 3% by weight, still more preferably from 0.01 to 1.5% by weight, most preferably from 0.05 to 1% by weight, of the roll-off reducing agent composition. The roll-off reducing agent can be used alone or in admixture of two or more kinds.

As the abrasive used in the present invention, any abrasives generally employed for polishing can be used. Examples of the abrasive may be the same ones as those used for the polishing composition of the above-mentioned embodiment a.

The total content of the abrasive is preferably from 1 to 40% by weight, more preferably from 2 to 30% by weight, still more preferably from 3 to 25% by weight, of the roll-off reducing agent composition, from the viewpoints of having economic advantages and making the surface roughness of a polished object small, thereby efficiently polishing the object to be polished.

Water in the roll-off reducing agent composition of the present invention is used as a medium, and the content of water is preferably from 55 to 98.999% by weight, more preferably from 60 to 97.5% by weight, still more preferably from 70 to 96.8% by weight, from the viewpoint of efficiently polishing the object to be polished.

In addition, the roll-off reducing agent composition of the present invention can be formulated with other components according to its purpose. The other compound includes, preferably, an organic acid or a salt thereof as an agent for increasing the polishing rate.

The organic acid or a salt thereof used in the present invention is not particularly limited as long as the organic acid or a salt thereof increases the polishing rate. The organic acid or a salt thereof includes monocarboxylic or polycarboxylic acids, aminocarboxylic acids, amino acids and salts thereof, and the like. These compounds can be roughly divided into the compounds (A) and the compounds (B) from their properties.

Although the compound belonging to the compounds (A) alone can increase the polishing rate, the compound also has a remarkable characteristic of having an action of further reducing roll-off by using the compounds (A) in combination with another agent for increasing polishing rate, represented by the compounds (B). When the compounds (A) are combined with the roll-off reducing agent of the present invention, the roll-off can be made even smaller. The compound for the compounds (A) may be the same ones as those used in the above-mentioned polishing composition of the embodiment a.

The compounds (B) used in the present invention are compounds especially having excellent action for increasing polishing rates. The compound for the compounds (B) may be the same ones as those used in the above-mentioned polishing composition of the embodiment a.

Among them, succinic acid, maleic acid, fumaric acid, glutaric acid, citraconic acid, itaconic acid, tricarballylic acid, adipic acid, diglycolic acid, nitrilotriacetic acid, ethylenediaminetetraacetic acid and diethylenetriaminepentaacetic acid and are preferable, and succinic acid, maleic acid, fumaric acid, citraconic acid, itaconic acid, tricarballylic acid, diglycolic acid, ethylenediaminetetraacetic acid and diethylenetriaminepentaacetic acid are more preferable.

The total content of the organic acid or a salt thereof is preferably from 0.01 to 10% by weight, more preferably from 0.02 to 7% by weight, still more preferably from 0.03 to 5% by weight, of the roll-off reducing agent composition, from the viewpoint of exhibiting its function, and from the viewpoints of economic advantages.

In addition, the other components besides the organic acid or a salt thereof include, for instance, an inorganic acid and a salt thereof, oxidizing agents, anticorrosive agents, basic substances, and the like. Concrete examples of the inorganic acid and a salt thereof, and the oxidizing agent may be the same as those used in the above-mentioned polishing composition of the embodiment a. Also, the content of the other components is preferably from 0.05 to 20% by weight, more preferably from 0.05 to 10% by weight, still more preferably from 0.05 to 5% by weight, of the roll-off reducing agent composition, from the viewpoint of exhibiting the respective functions and from the viewpoints of economic advantages.

In addition, the roll-off reducing agent composition of the present invention can optionally comprise other components such as a disinfectant and an antibacterial agent. The content of these disinfectant and antibacterial agent is preferably from 0.0001 to 0.1% by weight, more preferably from 0.001 to 0.05% by weight, still more preferably from 0.002 to 0.02% by weight, of the roll-off reducing agent composition, from the viewpoint of exhibiting the respective functions, and from the viewpoints of influences to the polishing performances and economic advantages.

The concentration of each component of the above-mentioned roll-off reducing agent composition is a preferable concentration during polishing, and it may be a concentration during the preparation of the composition. The roll-off reducing agent composition is usually prepared as a concentrate, and the concentrate is diluted upon use in many cases.

The roll-off reducing agent composition can be prepared by adding the desired additives and mixing the components by an arbitrary method.

It is preferable that the pH of the roll-off reducing agent composition is appropriately adjusted depending upon the kinds and the required qualities and the like of the substrate to be polished. For instance, the pH of the roll-off reducing agent composition is preferably from 2 to 12, from the viewpoints of the cleanability of the substrate to be polished and the anti-corrosiveness of the working machine, and from the viewpoint of the safety of the operator. In addition, in a case where a substrate to be polished is a substrate for precision parts which is mainly made of a metal such as an Ni—P plated aluminum alloy substrate, the pH is preferably from 2 to 10, more preferably from 2 to 9, still more preferably from 2 to 7, especially preferably from 2 to 5, from the viewpoints of increasing the polishing rate, improving the surface qualities and preventing clogging of the polishing pad. When the roll-off reducing agent composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 11, especially preferably from 9 to 11, from the viewpoints of increasing the polishing rate and improving the surface qualities. The pH can be adjusted by adding properly an inorganic acid such as nitric acid or sulfuric acid, an organic acid such as a hydroxycarboxylic acid, a polycarboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

4. Process for Producing Substrate

The process for producing a substrate of the present invention comprises the step of polishing a substrate to be polished with the polishing composition of the embodiment a or the roll-off reducing agent composition mentioned above.

The material for an object to be polished as representatively exemplified by the substrate to be polished used in the present invention includes, for instance, metals or metalloids such as silicon, aluminum, nickel, tungsten, copper, tantalum and titanium; alloys made of these metals as main components; glassy substances such as glass, glassy carbon and amorphous carbons; ceramic materials such as alumina, silicon dioxide, silicon nitride, tantalum nitride and titanium nitride; resins such as polyimide resins; and the like. Among them, it is preferable that an object to be polished is made of a metal such as aluminum, nickel, tungsten or copper, or made of an alloy containing these metals as the main components; or an object to be polished is a semiconductor substrate made of semiconductor elements containing these metals. Especially, in a case where the polishing composition of the embodiment a or the roll-off reducing agent composition of the present invention is used when polishing an aluminum alloy substrate plated with Ni—P, it is preferable because the roll-off can be especially reduced. Therefore, the present invention relates to a process for reducing roll-off of the above-mentioned substrate.

The shape for the object to be polished is not particularly limited. For instance, those having shapes containing planar portions such as discs, plates, slabs and prisms, or shapes containing curved portions such as lenses can be subjects for polishing with the polishing composition of the embodiment a or the roll-off reducing agent composition of the present invention. Among them, those having the disc-shaped objects are especially preferable in polishing.

The polishing composition of the embodiment a or the roll-off reducing agent composition of the present invention can be favorably used in polishing the substrate for precision parts. For instance, the polishing composition of the embodiment a or the roll-off reducing agent composition is suitable for polishing substrates for magnetic recording media such as magnetic discs, optical discs, and opto-magnetic discs; photomask substrates; glass for liquid crystals; optical lenses; optical mirrors; optical prisms; and semiconductor substrates. The polishing of a semiconductor substrate includes the polishing performed in the steps of polishing a silicon wafer (bare wafer), forming separation film for an embedding element, flattening an interlayer insulating film, forming an embedded metal line, and forming embedded capacitor, and the like. The polishing composition of the embodiment a or the roll-off reducing agent composition of the present invention is especially suitable for polishing a magnetic disc substrate.

5. Process of Reducing Roll-Off of Substrate

In the process of reducing roll-off of the polished substrate with the polishing composition of the embodiment a or the roll-off reducing agent composition of the present invention, the roll-off of the polished substrate can be remarkably reduced by polishing the substrate to be polished listed above with the polishing composition of the embodiment a or the roll-off reducing agent composition of the present invention as a polishing liquid. For instance, a substrate with reduced roll-off can be produced by clamping a substrate with polishing discs to which a polishing cloth made of nonwoven organic polymer fabric is pasted; feeding the polishing composition of the embodiment a of the present invention or the roll-off reducing agent composition of the present invention to a polishing surface; and moving the polishing discs or the substrate, with applying a given pressure.

The roll-off generated in the polished substrate in the present invention can be evaluated by determining the shape of the end surface part by using, for instance, a tracer or optical profilometer, and numerically expressing the extent of how much more the end surface is grounded as compared to the central portion of the disc in accordance with the profile.

The method of numerically expressing roll-off is determined as follows. As shown in FIG. 1, three points, i.e. point A, point B and point C, are taken on the detection curve which are given distances away from the center of the disc, the detection curve meaning the shape of the end surface part of the polished substrate. Roll off refers to a distance (D) between point B and a base line, wherein the base line is defined as a straight line connecting point A and point C. The term "having good roll-off" refers to a value of D more approximating 0. The roll-off value refers to a value obtained by dividing D by ½ of the amount of variation in the thickness of the disc before and after polishing.

The polishing composition of the embodiment a or the roll-off reducing agent composition of the present invention especially has an effect in the polishing process, and the polishing composition of the embodiment a or the roll-off reducing agent composition can be similarly applied to a process other than the polishing process, for instance, a lapping process, and the like.

EXAMPLES

Examples I-1 to I-11 and Comparative Examples I-1 to I-3

[Method for Formulating Polishing Composition]

There were mixed together abrasives [16 parts by weight of α-alumina (purity: about 99.9%) having primary average particle size: 0.23 μm, and secondary average particle size: 0.65 μm, and 4 parts by weight of intermediate alumina (θ-alumina, average particle size: 0.22 μm, purity: about 99.9%)], a given amount of other additive used in each Example or Comparative Example as listed in Table 1, and balance ion-exchanged water, with stirring, to give 100 parts by weight of a polishing composition.

[Determination for Specified Viscosity]

The specified viscosity for the resulting polishing composition was determined in accordance with the following method by diluting the polishing composition three-folds (vol/vol) in the same manner as the following polishing.

[Determination Method for Specified Viscosity]

The specified viscosity of a test solution was determined under the following conditions.

Measuring Device: one commercially available from Rheometric Scientific F. E. Ltd. under the trade name of ARES-100FRT-BATH-STD Measuring Jig: ARES-COU32T34A (trade name)

Measurement Conditions:
 Test type: Rete Sweep
 Temperature: 25° C.
 Initial Shearing Rate: 1 $s^{-1}$
 Final Shearing Rate: 1500 $s^{-1}$
 point per Decade: 5
 Measurement Time 2
 Analyzing Software: Orthestrator Software ver. 6.4.3 (trade name)

[Determinations of Polishing Rate and Roll-Off]

The resulting polishing composition was diluted 3-folds with ion-exchanged water (vol/vol), and a substrate surface made of an Ni—P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 1.27 mm and a diameter of 3.5 inches (diameter of 95.0 mm) was polished with a double-sided processing machine under Set Conditions for Double-Sided Processing Machine given below, to give a polished Ni—P plated, aluminum alloy substrate usable for a substrate for magnetic recording media.

Set Conditions for Double-Sided Processing Machine are as follows.

<Set Conditions for Double-Sided Processing Machine>

Double-sided processing machine: double-sided processing machine, Model 9B, manufactured by SPEEDFAM CO., LTD.

Processing pressure: 9.8 kPa

Polishing Pad: "H9900" (trade name), manufactured by FUJI SPINNING Co., Ltd.

Disc rotational speed: 30 r/min

Feeding flow rate for a diluted polishing composition: 125 ml/min

Polishing time period: 3.5 minutes
Number of substrates introduced: 10
[Polishing Rate]

and the relative roll-off value when the determination values for Comparative Example I-1 were used as a standard value 1 are shown in Table 1.

TABLE 1

| | Organic Acid-Based Additive | | | | Viscosity-Reducing Agent | | Polishing | |
|---|---|---|---|---|---|---|---|---|
| Ex. No. | Compound | Amt. (Parts by wt.) | Compound | Amt. (Parts by wt.) | Compound | Amt. (Parts by wt.) | Specified Viscosity (mPa · s) | Rate (Relative Value) | Roll-Off (Relative Value) |
| I-1 | Citric Acid | 0.5 | — | — | Polyphosphoric Acid | 0.2 | 1.7 | 1.01 | 0.75 |
| I-2 | Citric Acid | 0.5 | — | — | Sodium Hexamethaphosphate | 0.2 | 1.8 | 0.99 | 0.77 |
| I-3 | Citric Acid | 0.5 | — | — | Tricarboxylbutanephosphonic acid | 0.2 | 1.9 | 1.00 | 0.75 |
| I-4 | Citric Acid | 0.5 | — | — | Aminotri(methylenephosphonic acid) | 0.2 | 1.8 | 0.97 | 0.80 |
| I-5 | Citric Acid | 1.0 | — | — | Polyphosphoric Acid | 0.1 | 1.9 | 0.98 | 0.80 |
| I-6 | Citric Acid | 1.0 | — | — | PEG20000[1)] | 0.1 | 1.8 | 0.96 | 0.88 |
| I-7 | Citric Acid | 1.0 | — | — | Pluronic L62[2)] | 0.1 | 2.0 | 0.95 | 0.85 |
| I-8 | Citric Acid | 0.5 | Itaconic Acid | 0.5 | Polyphosphoric Acid | 0.2 | 1.7 | 1.03 | 0.85 |
| I-9 | Citric Acid | 1.0 | Itaconic Acid | 0.5 | Polyphosphoric Acid | 0.1 | 1.9 | 1.02 | 0.90 |
| I-10 | Citric Acid | 1.0 | Itaconic Acid | 0.5 | Polyphosphoric Acid | 0.5 | 1.9 | 0.96 | 0.84 |
| I-11 | Citric Acid | 0.2 | — | — | — | — | 1.6 | 0.98 | 0.78 |
| Comp. Ex. I-1 | Citric Acid | 1.0 | — | — | — | — | 2.1 | 1.00 | 1.00 |
| Comp. Ex. I-2 | Citric Acid | 0.5 | Itaconic Acid | 0.5 | — | — | 2.1 | 1.00 | 1.00 |
| Comp. Ex. I-3 | Citric Acid | 1.0 | Itaconic Acid | 0.5 | — | — | 2.1 | 1.02 | 0.97 |

[1)]PEG20000: Polyethylene glycol (molecular weight; 20000)
[2)]Pluronic L62: commercially available from ASAHI DENKA Co., LTD., polyethylene oxide-polypropylene oxide block polymer Weights of each substrate before and after polishing were measured using a device commercially available from Sartorius under the trade name of BP-210S. Change in weight of each substrate was obtained, and an average of 10 substrates was referred to as an amount reduced, and a value obtained by dividing the amount reduced by the polishing time was referred to as a rate of weight reduced. The rate of weight reduced was introduced into the following equation and converted to a polishing rate ($\mu$m/min). A relative value (relative polishing rate) of each Example or Comparative Example was calculated based on the polishing rate of the polishing composition in Comparative Example I-1 as a standard value 1.

Rate of Weight Reduced (g/min)=[Weight Before Polishing (g)–Weight After Polishing (g)]/Polishing Time (min.)

Polishing Rate ($\mu$m/min)=Rate of Weight Reduced (g/min.)/Area of One Side of Substrate (mm$^2$)/Ni—P Plating Density (g/cm$^3$)×10$^6$

[Roll-Off]

The roll off was determined using a device commercially available from Zygo Corp. under the trade name of Maxim 3D5700 under the following conditions:

Lens: Fizeau×1

Analyzing Software: Zygo Metro Pro (trade name)

Using the device as specified above, the shape of the end part of the disc at 41.5 mm to 47.0 mm away from the center of the disc was determined, and D (distance from the baseline at Point B) was obtained by using an analyzing software in accordance with the above determination method by taking points A, B and C at 41.5 mm away from the center of the disc, at 47 mm away from the center, and at 43 mm away from the center, respectively, as shown in FIG. 1. The value obtained by dividing D by ½ the amount of change of thickness of the disc before and after polishing was defined as the roll-off value. The relative polishing rate It can be seen from Table 1 that the polishing compositions of Examples I-1 to I-11 all having a specific viscosity within the range of 1.0 to 2.0 mPa·s, have lower roll-off values, as that compared to those of Comparative Examples I-1 to I-3.

Examples II-1 to II-5 and Comparative Examples II-1 and II-2

[Determination for Viscosity]

1. Method for Formulating Polishing Composition for Determining Viscosity

One part by weight of citric acid was dissolved in 69 parts by weight of ion-exchanged water, with stirring, and thereafter 20 parts by weight of an abrasive (commercially available from Fujimi Incorporated under the trade name of WA#10000) were added to the resulting solution, with stirring, and the mixture was stirred for 30 minutes, to give 90 parts by weight of a polishing composition (a).

A standard polishing composition was prepared by adding 10 parts by weight of ion-exchanged water to 90 parts by weight of the above-mentioned polishing composition (a) with sufficiently stirring, and stirring the mixture for 30 minutes.

A roll-off reducing agent-containing polishing composition was prepared by adding 10 parts by weight of a 1% by weight aqueous solution of the desired roll-off reducing agent to 90 parts by weight of the above-mentioned polishing composition (a) with sufficient stirring, and stirring the mixture for 30 minutes.

2. Determination Method for Viscosity

The viscosities of the above-mentioned standard polishing composition and the roll-off reducing agent-containing polishing composition were determined under the following conditions.

Measuring Device: one commercially available from Rheometric Scientific F. E. Ltd. under the trade name of ARES-100FRT-BATH-STD Measuring Jig: ARES-COU32T34A (trade name)

Measurement Conditions: Test type: Rete Sweep
  Temperature: 25° C.
  Initial Shearing Rate: 1 s$^{-1}$
  Final Shearing Rate: 1500 s$^{-1}$
  point per Decade: 5
  Measurement Time 2
  Analyzing Software: Orthestrator Software Ver. 6.4.3 (trade name)

The results are shown in Table 2.

99.9%) having primary average particle size of 0.23 μm, and secondary average particle size of 0.65 μm, and 4 parts by weight of an intermediate alumina (θ-alumina, average particle size: 0.22 μm, purity: about 99.9%)], given amounts of the additives as listed in Tables 3 to 6 as other additives, and balance ion-exchanged water, with stirring, to give 100 parts by weight of a polishing composition.

The resulting polishing composition was diluted 3-folds with ion-exchanged water (vol/vol), and a substrate surface made of an Ni—P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a

TABLE 2

| | Roll-Off Reducing Agent | | Viscosity* (mPa · s) | Amount of Decrease in Viscosity to Standard Polishing Composition (mPa · s) |
|---|---|---|---|---|
| | Compound | Amount (Parts by Weight) | | |
| Ex. II-1 | Polyphosphoric Acid | 0.1 | 2.10 | 0.34 |
| Ex. II-2 | Sodium Pyrophosphate | 0.1 | 2.00 | 0.44 |
| Ex. II-3 | Sodium Hexametaphosphate | 0.1 | 1.95 | 0.49 |
| Ex. II-4 | Tricarboxybutanephosphonic Acid | 0.1 | 2.25 | 0.19 |
| Ex. II-5 | Aminotri(methylenephosphonic Acid) | 0.1 | 1.92 | 0.52 |
| Standard Polishing Composition | — | — | 2.44 | 0.00 |
| Comp. Ex. II-1 | Sodium Nitrate | 0.1 | 2.45 | −0.01 |
| Comp. Ex. II-2 | Pluronic L-62** | 0.1 | 2.02 | 0.40 |

*Viscosities in Examples 1 to 5 are specified viscosities. The viscosity in Comparative Example 1 shows that the viscosity is increased as compared to the standard polishing composition.
**Pluronic L-62: commercially available from ASAHI DENKA Co., LTD., polypropylene oxide-polyethylene oxide block polymer It can be seen from the results shown in Table 2 that all the roll-off reducing agents used in Examples II-1 to II-5 have a function of reducing the Comparative Example II-1 does not reduce the viscosity of the polishing composition. Also, the compound of Comparative Example II-2 is not a Brönsted acid or a salt thereof although it has an amount of decrease in viscosity of 0.01 mPa·s or more, and it can be seen from the results of Comparative Example II-5 in Table 3 given below that the compound of Comparative Example II-2 has a deteriorated roll-off reducing effect as compared to the roll-off reducing agent of the present invention.

Examples II-6 to II-15 and Comparative Examples II-3 to II-9

[Method for Formulating Polishing Composition]

There were mixed together 20 parts by weight of the abrasives [16 parts by weight of α-alumina (purity: about thickness of 1.27 mm and a diameter of 3.5 inches (diameter of 95.0 mm) was polished with a double-sided processing machine under Set Conditions for Double-Sided Processing Machine given below, to give a polished Ni—P plated, aluminum alloy substrate usable for a substrate for magnetic recording media.

Set Conditions for Double-Sided Processing Machine are as follows.

<Set Conditions for Double-Sided Processing Machine>

Double-sided processing machine: double-sided processing machine, Model 9B, manufactured by SPEEDFAM CO., LTD.

Processing pressure: 9.8 kPa
Polishing Pad: "H9900" (trade name), manufactured by FUJI SPINNING Co., Ltd.
Disc rotational speed: 30 r/min
Feeding flow rate for a diluted polishing composition: 125 ml/min
Polishing time period: 3.5 minutes
Number of substrates introduced: 10

[Polishing Rate]

Weights of each substrate before and after polishing were measured using a device commercially available from Sartorius under the trade name of BP-210S. Change in weight of each substrate was obtained, and an average of 10 substrates was referred to as an amount reduced, and a value obtained by dividing the amount reduced by the polishing time is referred to as a rate of weight reduced. The rate of weight reduced is introduced into the following equation and converted to a polishing rate ($\mu$m/min).

Rate of Weight Reduced (g/min)=[Weight Before Polishing (g)−Weight After Polishing (g)]/Polishing Time (min.)

Polishing Rate ($\mu$m/min)=Rate of Weight Reduced (g/min.)/Area of One Side of Substrate ($mm^2$)/Ni—P Plating Density ($g/cm^3$)×$10^6$

[Roll-Off]

The roll off was determined using a device commercially available from Zygo Corp. under the trade name of Maxim 3D5700 under the following conditions:

Lens: Fizeau×1

Analyzing Software: Zygo Metro Pro (trade name)

Using the device as specified above, the shape of the end part of the disc at 41.5 mm to 47.0 mm away from the center of the disc was determined, and D (distance from the baseline at Point B) was obtained by using an analyzing software in accordance with the above determination method by taking points A, B and C at 41.5 mm away from the center of the disc, at 47 mm away from the center, and at 43 mm away from the center, respectively, as shown in FIG. 1. The value obtained by dividing D by ½ the amount of change of thickness of the disc before and after polishing was defined as the roll-off value.

TABLE 3

| | Roll-Off Reducing Agent | | Organic Acid | | Polishing | |
| | Compound | Amount (Parts by Weight) | Compound | Amount (Parts by Weight) | Rate (Relative Value) | Roll Off (Relative Value) |
| --- | --- | --- | --- | --- | --- | --- |
| Ex. II-6 | Polyphosphoric Acid | 0.2 | Citric Acid | 0.5 | 1.01 | 0.75 |
| Ex. II-7 | Sodium Pyrophosphate | 0.2 | Citric Acid | 0.5 | 0.91 | 0.76 |
| Ex. II-8 | Sodium Hexametaphosphate | 0.2 | Citric Acid | 0.5 | 0.99 | 0.77 |
| Ex. II-9 | Tricarboxybutanephosphonic Acid | 0.2 | Citric Acid | 0.5 | 1.00 | 0.75 |
| Ex. II-10 | Aminotri(methylenephosphonic Acid | 0.2 | Citric Acid | 0.5 | 0.97 | 0.80 |
| Comp. Ex. II-3 | — | — | Citric Acid | 0.5 | 1.00 | 1.00 |
| Comp. Ex. II-4 | Sodium Nitrate | 0.2 | Citric Acid | 0.5 | 0.98 | 1.01 |
| Comp. Ex. II-5 | Pluronic L-62** | 0.1 | Citric Acid | 0.5 | 0.90 | 0.93 |

**Pluronic L-62: commercially available from ASAHI DENKA Co., LTD., polypropylene oxide-polyethylene oxide block polymer The relative polishing rate and the relative roll-off value when the determination values for Comparative Example II-3 were used as standard value 1 are shown in Table 3. It can be seen from the results of Table 3 that in cases of Example II-6 to II-10 where the roll-off reducing agents having reduced specified viscosity as shown in Table 2 were used, the roll-off can be reduced while maintaining the polishing rate, as compared to Comparative Example II-3. It can be seen in the case of Comparative Example 4 in which sodium nitrite which did not show decrease in viscosity in Table 2 was used that the roll-off value is not reduced. It can be seen in the case of Comparative Example II-5 in which polypropylene oxide-polyethylene oxide block polymer was used that the amount of the roll-off reduced is small.

TABLE 4

| | Roll-Off Reducing Agent | | Organic Acid | | Polishing | |
| | Compound | Amount (Parts by Weight) | Compound | Amount (Parts by Weight) | Rate (Relative Value) | Roll-Off (Relative Value) |
| --- | --- | --- | --- | --- | --- | --- |
| Ex. II-11 | Polyphosphoric Acid | 0.1 | Citric Acid | 1.0 | 0.98 | 0.80 |
| Comp. Ex. II-6 | — | — | Citric Acid | 1.0 | 1.00 | 1.00 |

The relative polishing rate and the relative roll-off value when the determination values for Comparative Example II-6 were used as standard value 1 are shown in Table 4. It can be seen from the results of Table 4 that in the case of Example II-11 where the roll-off reducing agent having reduced specified viscosity as shown in Table 2 was used, the roll-off can be almost reduced while maintaining the polishing rate, as compared to Comparative Example II-6.

TABLE 5

| | Roll-Off Reducing Agent | | Organic Acid | | | | Polishing Rate (Relative Value) | Roll Off (Relative Value) |
|---|---|---|---|---|---|---|---|---|
| | Compound | Amount (Parts by Weight) | Compound | Amount (Parts by Weight) | Compound | Amount (Parts by Weight) | | |
| Ex. II-12 | Polyphosphoric Acid | 0.2 | Citric Acid | 0.5 | Itaconic Acid | 0.5 | 1.03 | 0.85 |
| Ex. II-13 | Polyphosphoric Acid | 0.1 | Citric Acid | 1.0 | Itaconic Acid | 0.5 | 1.02 | 0.90 |
| Ex. II-14 | Polyphosphoric Acid | 0.5 | Citric Acid | 1.0 | Itaconic Acid | 0.5 | 0.96 | 0.84 |
| Comp. Ex. II-7 | — | — | Citric Acid | 0.5 | Itaconic Acid | 0.5 | 1.00 | 1.00 |
| Comp. Ex. II-8 | — | — | Citric Acid | 1.0 | Itaconic Acid | 0.5 | 1.02 | 0.97 |

The relative polishing rate and the relative roll-off value when the determination value for Comparative Example II-7 were used as standard value 1 are shown in Table 5. It can be seen from the results of Table 5 that the polishing composition has an effect of reducing roll-off by using the roll-off reducing agent of the present invention even when plural aids are contained.

TABLE 6

| | Roll-Off Reducing Agent | | Organic Acid | | | | Inorganic Acid | | Polishing Rate (Relative Value) | Roll Off (Relative Value) |
|---|---|---|---|---|---|---|---|---|---|---|
| | Compound | Amount (Parts by Weight) | Compound | Amount (Parts by Weight) | Compound | Amount (Parts by Weight) | Compound | Amount (Parts by Weight) | | |
| Ex. II-15 | Polyphosphoric Acid | 0.1 | Citric Acid | 1.0 | Itaconic Acid | 0.5 | Ammonium Sulfate | 0.5 | 0.98 | 0.82 |
| Comp. Ex. II-9 | — | — | Citric Acid | 1.0 | Itaconic Acid | 0.5 | Ammonium Sulfate | 0.5 | 1.00 | 1.00 |

The relative polishing rate and the relative roll-off value when the determination values for Comparative Example II-9 were used as standard value 1 are shown in Table 6. It can be seen from the results of Table 6 that the polishing composition has an effect of reducing roll-off by using the roll-off reducing agent of the present invention even when plural aids are contained.

Since the polishing composition, or the roll-off reducing agent composition comprising the roll-off reducing agent is used for polishing a substrate for precision parts, there is exhibited an effect that the roll off of the substrate is dramatically reduced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition comprising an abrasive, water and an organic acid or a salt thereof, wherein the composition has a specified viscosity of from 1.0 to 2.0 mPa·s at a shearing rate of 1500 s$^{-1}$ and 25° C.

2. The polishing composition according to claim 1, further comprising a viscosity-reducing agent.

3. A polishing composition comprising a roll-off reducing agent which comprises a Brönsted acid or a salt thereof, an abrasive and water, wherein the composition has a specified viscosity of from 1.0 to 2.0 mPa·s at a shearing rate of 1500 s$^{-1}$ and 25° C.

4. The polishing composition according to claim 3, further comprising an organic acid or a salt thereof.

5. A process for producing a substrate comprising a step of polishing a substrate to be polished with the polishing composition of claim 1 or 2.

6. A process for producing a substrate comprising a step of polishing a substrate to be polished with the polishing composition of claim 3.

7. The process according to claim 5, wherein the substrate to be polished is a magnetic disk substrate.

8. The process according to claim 6, wherein the substrate to be polished is a magnetic disk substrate.

9. A process of reducing roll-off of a substrate, comprising applying to a substrate to be polished the polishing composition as defined in claim 1 or 2.

10. A process of reducing roll-off of a substrate, comprising applying to a substrate to be polished the polishing composition as defined in claim 3.

* * * * *